United States Patent [19]

Fritz et al.

[11] 4,234,384
[45] Nov. 18, 1980

[54] SUPPORT STRUCTURE FOR THE CORE OF A HIGH CAPACITY GAS COOLED HIGH TEMPERATURE REACTOR

[75] Inventors: Rolf Fritz, Oftersheim; Karl-Friedrich Kissel, Hemsbach, both of Fed. Rep. of Germany

[73] Assignee: Hochtemperatur-Reaktorbau GmbH, Cologne, Fed. Rep. of Germany

[21] Appl. No.: 899,400

[22] Filed: Apr. 24, 1978

[30] Foreign Application Priority Data

Apr. 26, 1977 [DE] Fed. Rep. of Germany ....... 2718493

[51] Int. Cl.² .............................................. G21C 3/44
[52] U.S. Cl. .................................. 176/58 PB; 176/84
[58] Field of Search ................... 176/58 PB, 59, 60, 84

[56] References Cited

U.S. PATENT DOCUMENTS

| | | | |
|---|---|---|---|
| 3,010,888 | 11/1961 | Battle | 176/84 |
| 3,100,187 | 8/1963 | Fraas | 176/58 PB |
| 3,157,582 | 11/1964 | Babule et al. | 176/84 |
| 3,172,820 | 3/1965 | Lenngren et al. | 176/84 |
| 3,206,373 | 7/1965 | Dupuy | 176/84 |
| 3,228,852 | 1/1966 | Holmes et al. | 176/58 PB |
| 3,560,338 | 2/1971 | Brown | 176/60 |
| 3,607,643 | 9/1971 | Paget | 176/84 |
| 3,960,656 | 6/1976 | Lohnert et al. | 176/58 PB |

FOREIGN PATENT DOCUMENTS

| | | | |
|---|---|---|---|
| 2636251 | 2/1978 | Fed. Rep. of Germany | 176/58 PB |
| 2709171 | 9/1978 | Fed. Rep. of Germany | 176/58 PB |
| 1426264 | 12/1965 | France | 176/58 PB |
| 1018299 | 1/1966 | United Kingdom | 176/60 |
| 1113145 | 5/1968 | United Kingdom | 176/59 |
| 1294087 | 10/1972 | United Kingdom | 176/60 |

Primary Examiner—S. A. Cangialosi
Attorney, Agent, or Firm—Schwartz, Jeffery, Schwaab, Mack, Blumenthal & Koch

[57] ABSTRACT

Disclosed is a support structure consisting of several layers of prismatic graphite blocks arranged over each other. The layers are constructed as closed units without expansion gaps and the blocks of one layer are keyed together with the blocks of the adjacent layers. The upper layers are composed of a plurality of preferably hexagonal graphite blocks equipped with passages for the cooling gas, while the bottom layer is formed by a number of support structures, each consisting of several support segments fitted together preferably into a hexagonal cross section, with each support unit resting at its central section on a column head of a round column and carrying a limited number of the hexagonal graphite blocks and that cooling gas channels are provided at the locations of the bottom layer where three support units meet.

5 Claims, 5 Drawing Figures

SUPPORT STRUCTURE FOR THE CORE OF A HIGH CAPACITY GAS COOLED HIGH TEMPERATURE REACTOR

FIELD OF THE INVENTION

The present invention relates to a support structure for the core of a high capacity gas cooled high temperature reactor surrounded by an annular side reflector.

More particularly, the invention relates to a core formed by a bed of spherical fuel elements with a number of pebble retracting tubes passing through the support structure.

BACKGROUND OF THE PRIOR ART

Supporting structures for gas cooled core reactors built up from vertical columns are known. In such structures, either a number of supporting plates of polygonal configuration are arranged with lateral spacing adjacent to each other in a plane. Each of the plates are designed to carry a limited number of moderator columns, or else each moderator column is supported by a metal cylinder. At the same time, cooling gas channels present in both the moderator columns and the metal cylinders are aligned with each other.

An example of a supporting structure of the type described in the foregoing is shown in the West German published application No. 11 77 751. In this patent application, seven moderator columns, equipped with central borings, are associated with every supporting plate. The borings are coaxial with borings in the supporting plates. Only the column arranged in the center of the group of moderator columns is connected with the supporting plate. In this manner, the supporting plate is capable of expansion around the axis of this column.

In West German published application No. 1 122,641, a supporting structure is illustrated in which, as previously described, for every moderator column a supporting element in the form of a metal cylinder is provided. The moderator columns and the metal cylinders rest on each other on spherical bearing surfaces in the manner of a ball joint.

It is known from West German published application No. 1 194 071, that support of the moderator structure is made of a solid material of a nuclear reactor on a flat supporting surface. The supporting surface is composed of several parts, which are rigid in themselves. Each part of the supporting structure is carried by a certain number of support posts, arranged symmetrically around the axis of the moderator structure. The supporting surfaces surround a center part of the plate and several concentric annular frames which may have a small amount of free radical play between them.

According to the West German patent application No. 1 614,684, the supporting structure for a reactor block may consist of a cell structure composed of tubular elements, connected with each other at their ends by two horizontally arranged disks. Each of the tubular elements, which have hexagonal cross sections, is aligned with one of the columns of the reactor block. The supporting structure also serves as a biological shield, for which purpose at least two layers of graphite inserts are provided in the tubular elements.

Another supporting structure for the core of a gas cooled nuclear reactor is described in the West German patent application No. 1 956 266, in which the core rests on the bottom of the reactor pressure vessel upon refractory material. Cooling gas is admitted to the core through channels formed in the refractory material and connected with gas channels in the core and the gas space outside the core. The state of the art also includes a support floor for a pebble bed reactor consisting of pebbles of a high temperature material and a supporting structure for the weight of the pebble support layer and the fuel pebbles, the pebbles being piled directly onto the pebble support layer. The supporting structure and the pebble support layer are separated by a layer of tiles resistant to elevated temperatures.

Several vertical tubular stacks are provided at regular intervals for the constant venting of the fuel pebbles through the supporting structure and the pebble bed layer. These tubular stacks determine the least thickness and the average thickness of the supporting pebble bed.

In another pebble bed reactor, the THTR-300 MWe, the supporting floor for the bed of fuel pebbles consist of a plurality of hexagonal graphite blocks arranged into freely movable columns and having axial borings for the cooling gas. The columns formed by the graphite blocks are individually supported by one round column each, said round columns being attached into the floor and consists of graphite plates. The fixed point of the round columns is represented by the central pebble vent tube. By reducing the nominal dimensions of the hexagonal graphite blocks, expansion gaps are created which permit unhindered thermal expansion within the supporting floor without exceeding its overall dimensions. Under certain non-stationary operating conditions, e.g., in the case of accidental disruption, the gaps may add up and lead to relatively large single gaps. The closing of such gaps by relocating the graphite blocks requires high relocating forces which, however, in view of the dimensions of THTR-300 MWe are of minor importance. If the capacity of the reactor is increased, together with the dimensions of the reactor core and its installations, supporting floors designed on the principle described in the foregoing cannot be utilized without further changes, because the expansion gap and the relocating forces in the hexagonal arrangement of the blocks assume orders of magnitude, as a result of the substantial variation of parameters in the presence of which the supporting floor can no longer perform its function (vertical support of fuel elements, venting of fuel elements from the core, conduct of gas, shielding). A decisive factor in this respect is the flow behavior of fuel pebbles through the reactor core. A balanced flow behavior requires the availability of several pebble removal tubes, for which conical pebble inlets must be provided. Other parameters to be considered are stresses generated by dead weight, pressure gradients and the forces of absorber rods, also thermal expansions occurring with large dimensions of the core. All of these must be controlled.

SUMMARY OF THE INVENTION

Beginning with the so-called state-of-the-art, the present invention provides a support structure for the core of the high temperature gas cooled reactor, which guarantees the capability of the support structure to perform the functions of said structure listed in the foregoing independently of the performance of the structure of the core. The present invention also furnishes solutions of the thermal and mechanical problems encountered in may prior art devices.

According to the invention, the support structure consists of several layers of prismatic graphite blocks arranged over each other. The layers are constructed as closed units without expansion gaps and the blocks of one layer are keyed together with the blocks of the adjacent layers. The upper layers are composed of a plurality of preferably hexagonal graphite blocks equipped with passages for the cooling gas, while the bottom layer is formed by a number of support structures, each consisting of several support segments fitted together preferably into a hexagonal cross section, with each support unit resting at its central section on a column head of a round column and carrying a limited number of the hexagonal graphite blocks and that cooling gas channels are provided at the locations of the bottom layer where three support units meet.

The support device of the invention represents a stable and rigid support structure which satisfactorily performs all functions, such as supporting, pebble removal, gas conduction and shielding. It forms a closed unit without expansion gaps which adapts itself to the thermal cycles of the reactor core. As the result of the interkeying of the prismatic graphite blocks in the form of a layer structure, thermal movements are in the support structure, and are passed on to the adjacent blocks so that summation of gaps can occur. Correspondingly, the entire support structure and the annular lateral reflector expand in the radial direction.

Because of the interkeying of the prismatic blocks, no relocating forces are necessary to equalize the bottom configuration. The support structure is, therefore, capable of adapting itself to any reactor state. Thermal expansion and supporting forces in the radial direction are equalized by way of a suitable lateral support of the side reflector. In the design of the prismatic graphite blocks, material properties are taken specifically into consideration, so that even in the case of an external disruption, e.g., by an earthquake, no tensile stresses can be transmitted in the support structure.

The support structure according to the invention is largely independent of the capacity and dimensions of the core. It may be applied with special advantage to high temperature reactors with spherical fuel elements. However, with slight modification, it may also be used in high temperature reactors with block-shaped fuel elements. In the process, the structure facilitates particularly the solution of thermal problems.

The support structure according to the invention offers an additional advantage by the fact that it renders the solution of problems associated with design difficulties in the bottom area of high temperature reactors and with the support of the side reflector. Thus, no roller bearings are required for the bottom area and only slight forces, or none at all, are generated in the side reflector.

The upper layers of the prismatic graphite blocks are designed with respect to their height so that a conical inlet for the spherical fuel elements is formed for every pebble removal tube. Support units located in the bottom layer are designed in the area of the pebble removal tubes with respect to their cross section so that they surround the pebble removal tubes without gaps. There is a suitable adaptation in the boundary zone toward the side reflector.

The support structure is preferably constructed of three layers. In the upper and intermediate layer, a central graphite block is surrounded by six graphite blocks and is aligned with one of the round columns. The peripheral graphite blocks are coordinated in the process always with three different central graphite blocks, i.e., each peripheral graphite block simultaneously belongs to the border of three central graphite blocks.

Conveniently, in all of the hexagonal graphite blocks of the upper layer, a plurality of small vertical borings is provided for the cooling gas, said borings being connected with the collector spaces found in the graphite blocks of the intermediate layer. The collector spaces of the peripheral graphite blocks are designed in the form of continuous borings, aligned with the cooling gas channels present in the bottom layer. The collector spaces provided in the central graphite blocks, representing sack-like borings. They are connected with the continuous borings in the corresponding peripheral graphite blocks through several connecting borings. Further, gas flow takes place through the cooling gas channels of the bottom layer in a hot gas collector space located underneath the support structure. Underneath the side reflector, the hot gas collector space widens, which renders connection with radial gas conduits of a suitable diameter possible.

Between the support structure and the side reflector, a continuous vertical separating gap may be provided advantageously, so that differential thermal expansion (because of temperature differences) in the vertical direction is possible.

BRIEF DESCRIPTION OF THE DRAWINGS

In the drawing, an example of the support structure of the invention for a pebble bed reactor of high capacity is represented diagrammatically. The individual figures show the following.

DETAILED DESCRIPTION OF THE INVENTION

Figure 1:
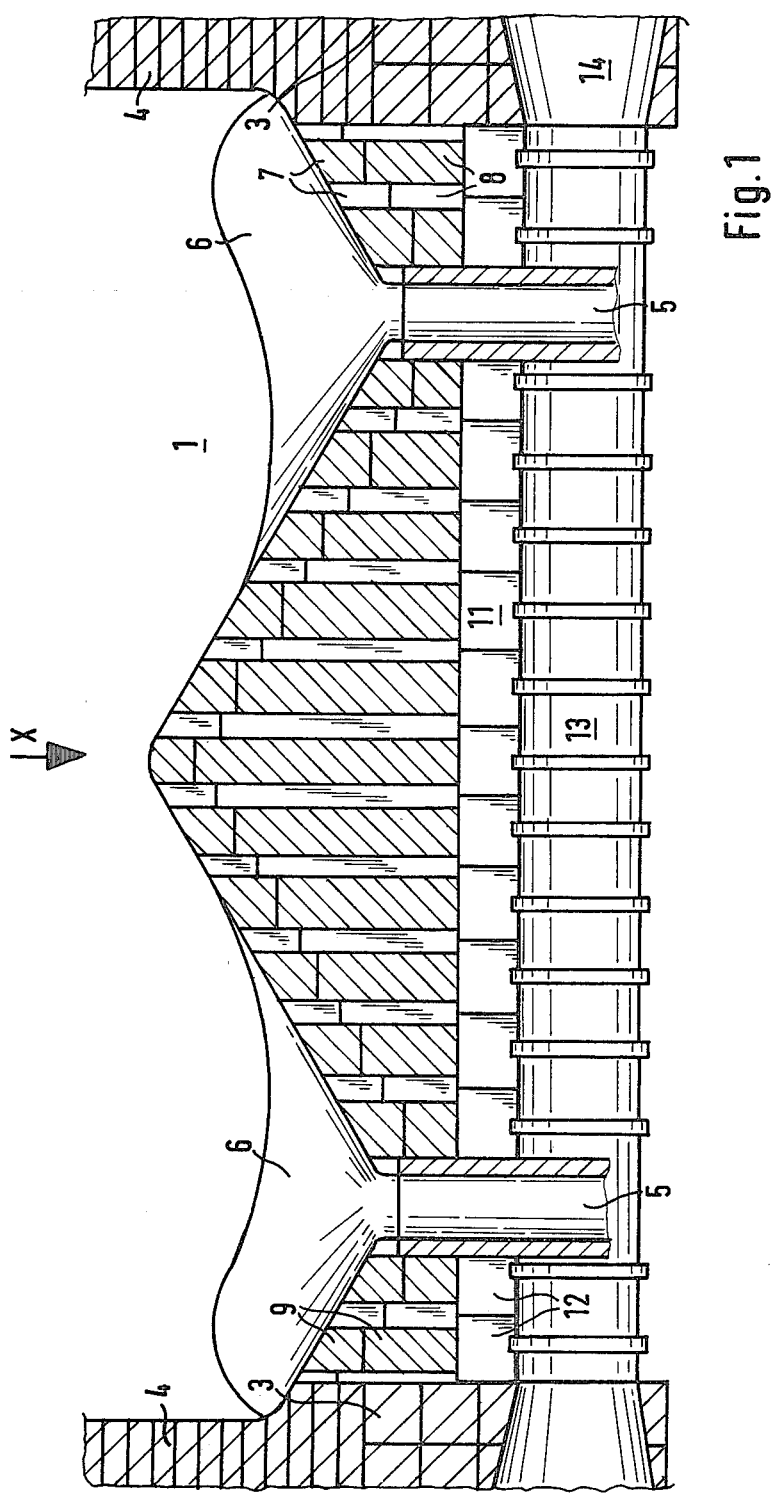
FIG. 1—a vertical cross section through the support structure on the line A—A of FIG. 2.
Figure 2:
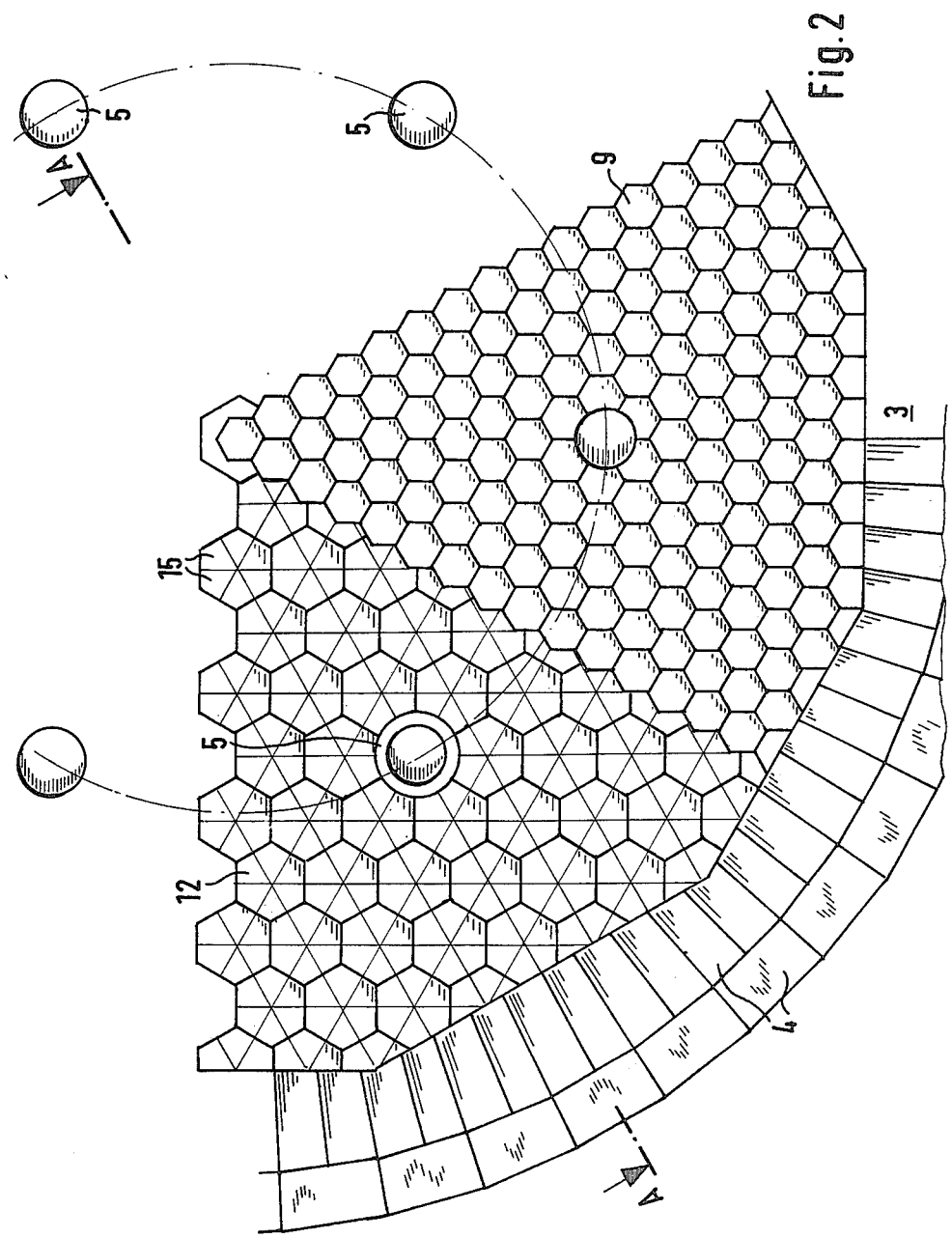
FIG. 2—a top view of the support structure in the X direction of FIG. 1, where at right the plane of the pebble inlet and at left the plane of the support units is represented.
Figure 3:
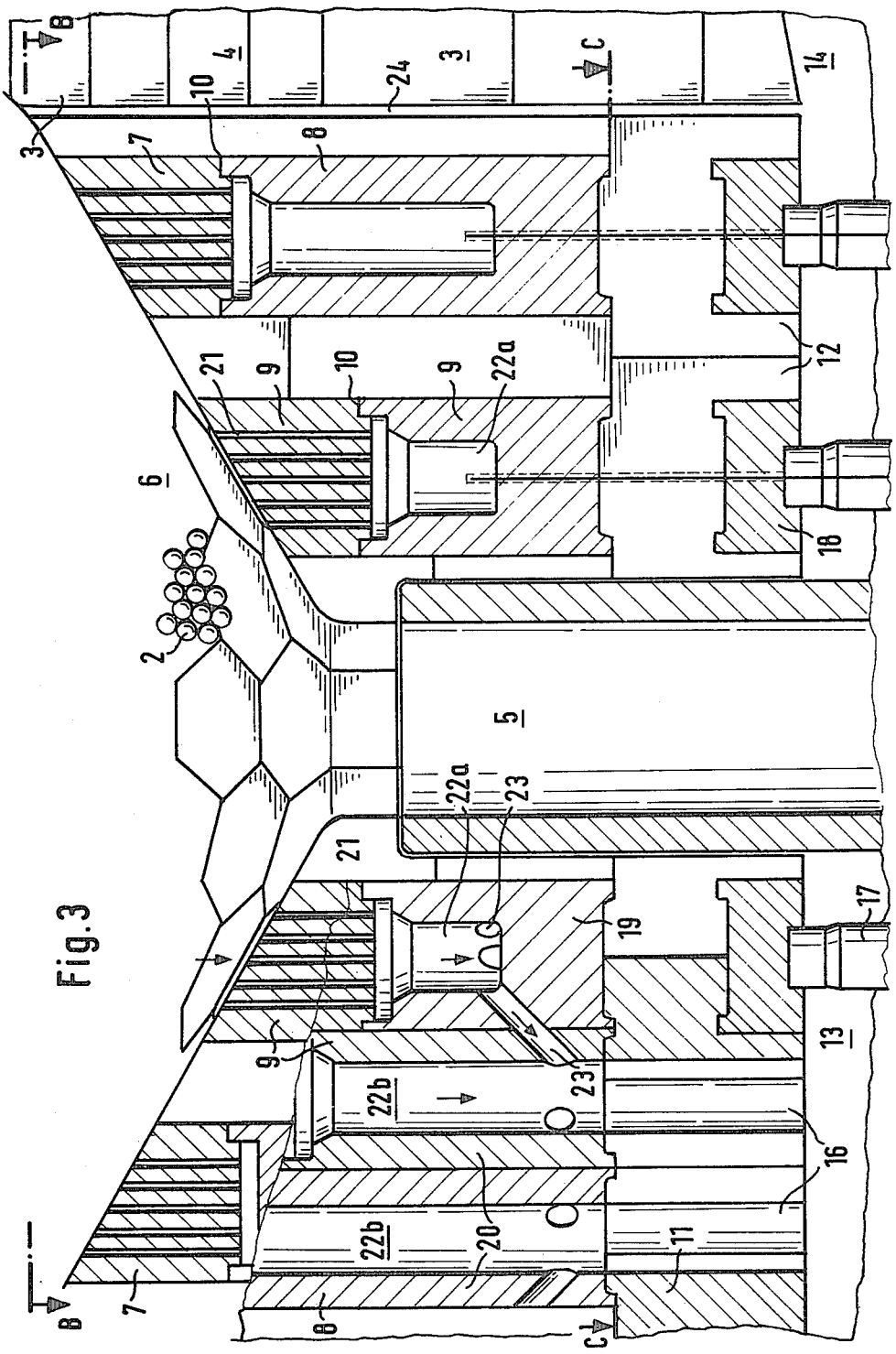
FIG. 3—a vertical cross section through the support structure in the area of a pebble removal tube at an enlarged scale.

As disclosed, generally FIG. 1 and, in greater detail, in FIG. 3, the core 1 of a high temperature gas cooled nuclear reactor is formed by a bed of spherical fuel elements 2 and is generally surrounded by an annular side reflector 3. The reflector 3 is constructed of a plurality of graphite bricks 4. Removal tubes 5 are illustrated at the bottom of the bed of spherical fuel elements hereinafter referred to as the pebble bed. Six of these removal tubes lead from the pebble bed to a charging installation (not illustrated). In FIG. 2 the regular arrangement of the pebble bed removal tubes 5 is illustrated on a pit circle around the axis of the reactor core. For each pebble removal tube 5, a conical pebble inlet 6 is provided. The inlet itself is formed by part of the support structure.

The support structure consists of three layers of prismatic graphite blocks constructed as a closed unit without expansion gaps, as illustrated in FIG. 2. The top layer 7 and the intermediate layer 8 are composed of a plurality of hexagonal graphite blocks 9 connected through a keying arrangement 10 with each other. The graphite blocks 9 of the top layer 7 and intermediate layer 8 are designed with respect to their height so that the conical pebble inlets 6 are necessarily formed, as illustrated in FIG. 3. The bottom layer 11 of the support structure is formed by a number of support units 12. These units are also interkeyed with the intermediate layer 8 which is located above them. Beneath bottom layer 11, a hot gas collector space 13 is provided for collecting cooling gas. The cooling gas flowing through the fuel element pebble bed from top to bottom collects in this space. In the area of the pebble removal tubes 5, support units 12 are designed so that no gaps remain between the pebble removal tubes and the various support units. The support units 12 and the graphite blocks 9 again exhibit different cross sections toward the side reflector 3. Beneath the side reflector 3, the hot gas collector space 13 is in direct communication with an expanding area 14 making possible the connection of the radial cooling gas conduits with the collector space.

Figure 5:
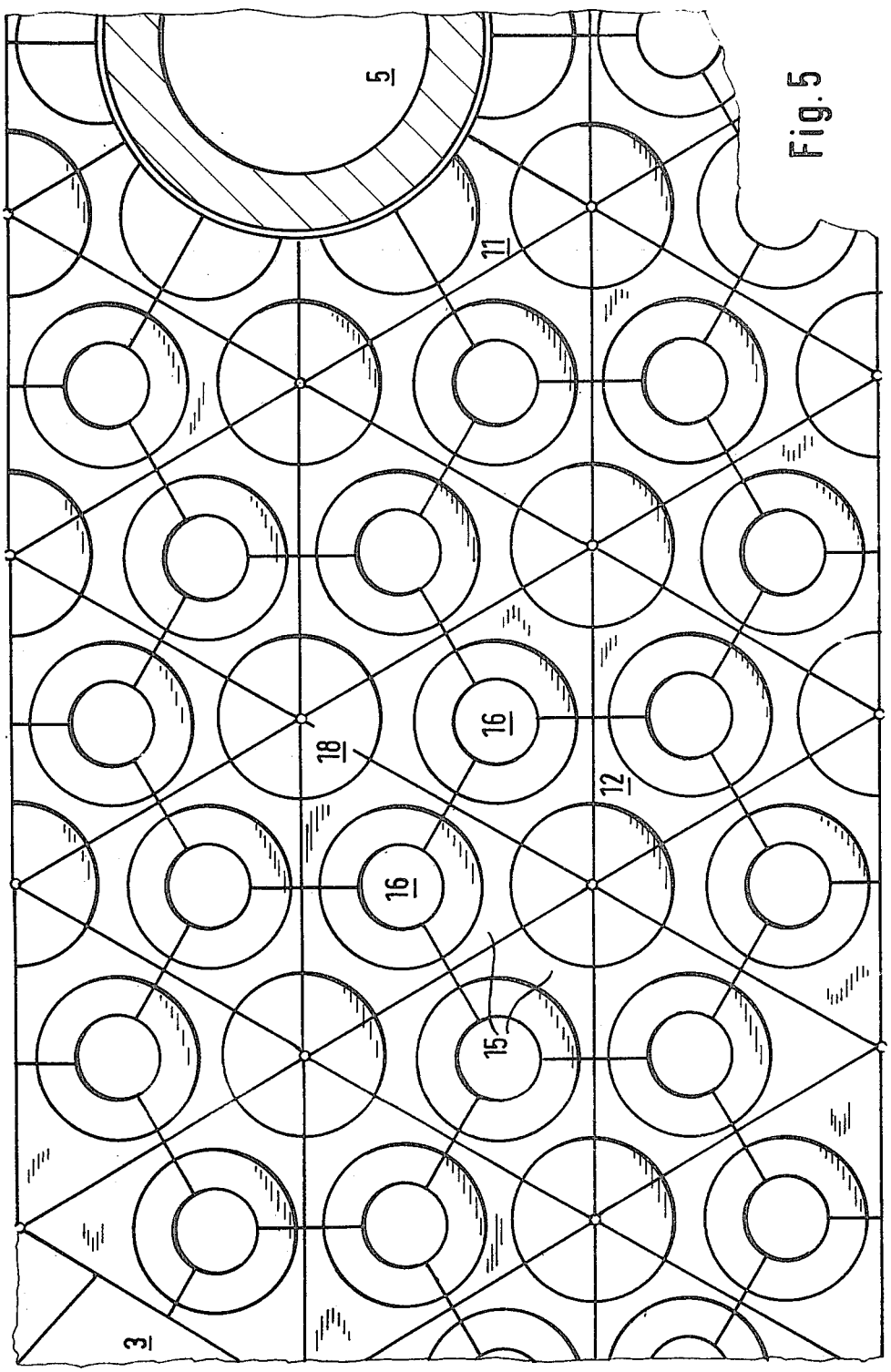
FIG. 5—a section of the support structure in section through the line C—C of FIG. 3.

As illustrated in FIG. 5, each support unit 12 consists of several support segments 15 fitted together into a hexagonal cross section. At the location of lower layer 11 representing the juncture of three support units 12, cooling gas channels 16 are provided. These terminate in the hot gas collector space 13. All of the support units 12 rest on a round column 17, directly through a column head 18. The column head 18 is set into a recess located in the center of the support unit and interkeyed with it. The round columns 17 traverse the hot gas collector space 13 and adjoin to the bottom of the nuclear reactor.

Figure 4:
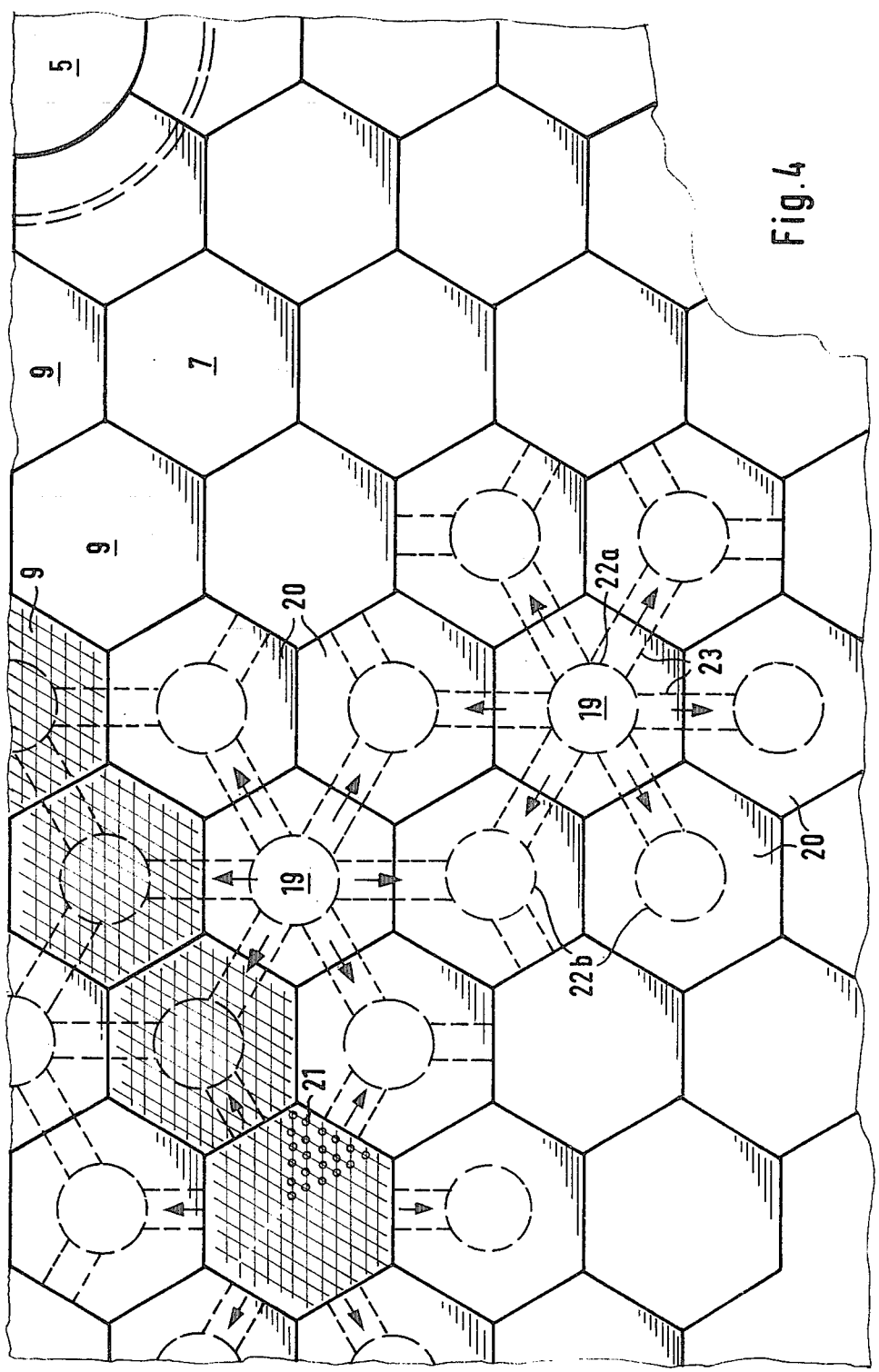
FIG. 4—a section of the support structure in section through the line B—B in FIG. 3.

As illustrated in FIG. 2, the support units 12 are of a hexagonal cross section and are significantly larger than the hexagonal graphite blocks 9 of the uppermost and intermediate layer of the support structure. Each support unit must, according to the invention, carrying of several graphite blocks 9 and of the fuel element pebbles 2 resting on the graphite blocks. In the top layer 7 and intermediate layer 8, a plurality of "central" graphite blocks 19 is present. The central blocks 19 are always surrounded by six "peripheral" graphite blocks 20 as illustrated in FIG. 4. Each of the peripheral graphite blocks 20 forms a part of the boundary of three different central graphite blocks 19. In this manner, the group comprising seven graphite blocks are each boxed in with each other over the layer 11. Each of the central graphite blocks 19 is aligned with one of the round columns 17. In all of the hexagonal graphite blocks 9 of the uppermost layer 7, a plurality of small vertical borings 21 are provided for the cooling gas. These are connected with the collector spaces 22 present in the graphite blocks 9 of the intermediate layer 8, while the collector space is located in the central graphite block 19 are designed as sack-like borings 22A. The collector spaces in the peripheral blocks 2 present continuous borings 22B. These borings are aligned with a cooling gas channel 16 in the support units 12. The sack-like borings 22A in the central graphite blocks 19 are connected with the continuous borings 22B connected with several connecting borings 23 as illustrated in FIGS. 3 and 4.

In FIG. 3 one of the connecting borings 23 is rotated in the illustration. Furthermore, FIG. 3 illustrates the way by which differential expansion of the side reflector 3 in the three layers, 7, 8 and 11, of the support structure is permitted in the continuous vertical separating gap 24.

The drawings are illustrative of the preferred embodiment of the present invention and are not intended to limit the disclosure of the present invention in any unduly restrictive manner. Obvious equivalents will be recognized as suitable to the skilled artisan and are considered to be included in the concept of the invention.

What is claimed is:

1. Support structure for the core of a gas cooled high temperature, high capacity reactor said core comprising a bed of spherical fuel elements and being surrounded by an annular side reflector, said support structure comprising:
   a plurality of layers of prismatic graphite blocks, arranged upon each other, said layers being constructed as a closed unit without expansion gaps with the blocks of one layer being interkeyed with the blocks of adjacent layers, and with the upper layers being composed of a plurality of preferably hexagonal graphite blocks;
   a plurality of spherical fuel element removal passageways through the support structure;
   a plurality of passages through said blocks for the cooling gas of the reactor;
   a plurality of support units disposed as the lower layer of the support structure and consisting of several support segments fitted together to preferably form a hexagonal cross section;
   a plurality of round columns supporting said support unit and having a column head and carrying a limited number of the hexagonal graphite blocks of said layers; and
   a plurality of cooling gas channels disposed in locations of the bottom layer, representing the juncture of three support units.

2. The support structure of claim 1 wherein the upper layers of the graphite blocks are designed with respect to their height so that a conical inlet is formed for the spherical fuel elements supported in the core and that the support units are designed conformingly in the area of the fuel element removal tubes with respect to their cross section.

3. Support structure of claim 2 wherein the support structure is constructed of three layers with the uppermost and the intermediate layer each comprising a central graphite block surrounded by six graphite blocks and aligned with one of the round columns and with each of the peripheral graphite blocks associated with three different central graphite blocks.

4. The support structure of claim 3, further comprising a plurality of cooling gas collector spaces disposed in the intermediate layer wherein each of the hexagonal graphite blocks of the uppermost layer possess a plurality of small vertical borings for transport of the cooling gas, said borings being connected with said collector spaces; wherein the collector spaces of the peripheral graphite blocks are designed in the form of continuous borings aligned with said cooling gas channels, located in the bottom layer; and wherein the collector spaces are connected in the central graphite blocks by way of connecting borings with the continuous borings in the peripheral graphite blocks associated with said central blocks.

5. The support structure of claim 1, further comprising a continuous vertical separating gap between the support structure and the side reflector.

* * * * *